United States Patent [19]

Boulloy et al.

[11] Patent Number: 4,950,080
[45] Date of Patent: Aug. 21, 1990

[54] METALLIC STRIP DESIGNED FOR THE MANUFACTURE OF SOLID ELECTROLYTE CAPACITORS, MANUFACTURING METHOD THEREOF, AND CAPACITORS OBTAINED THEREBY

[75] Inventors: Georges Boulloy, Dijon; Gilles Bernard, Seurre, both of France

[73] Assignee: Compagnie Europeenne de Composants Electroniques LCC, Courbevoie, France

[21] Appl. No.: 316,788

[22] Filed: Feb. 28, 1989

[30] Foreign Application Priority Data

Mar. 1, 1988 [FR] France .................. 88 02531

[51] Int. Cl.⁵ .............................. H01G 9/00
[52] U.S. Cl. .................... 361/525; 29/25.03
[58] Field of Search .............. 29/570.1; 361/525, 526, 361/527, 531–535, 540, 523, 524

[56] References Cited

U.S. PATENT DOCUMENTS

| | | | |
|---|---|---|---|
| 3,566,520 | 3/1971 | Namikata et al. | 29/570.1 |
| 3,679,944 | 7/1972 | Yoshimura et al. | 361/527 |
| 3,872,358 | 3/1975 | Murakami et al. | 361/526 |
| 3,940,667 | 2/1976 | Pearce | 361/523 |
| 4,679,124 | 7/1987 | Yoshimura et al. | 361/527 |

FOREIGN PATENT DOCUMENTS

| | | |
|---|---|---|
| 1157707 | 11/1963 | Fed. Rep. of Germany . |
| 2247797 | 5/1975 | France . |
| 2583216 | 12/1986 | France . |
| 2153148 | 8/1985 | United Kingdom . |

Primary Examiner—Donald A. Griffin
Attorney, Agent, or Firm—Oblon, Spivak, McClelland, Maier & Neustadt

[57] ABSTRACT

The disclosure concerns solid electrolyte capacitors, the anode part of which is formed by etched and oxidated metallic foils. The electrolyte of these capacitors is formed by a material deposited in lacquer form on the metallic foils.

8 Claims, 5 Drawing Sheets

FIG_1 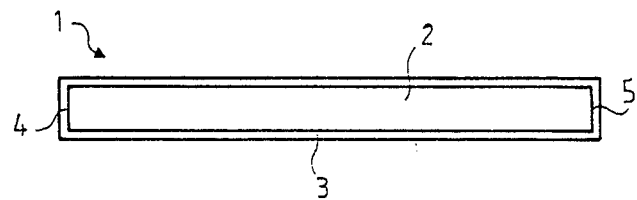
FIG_2 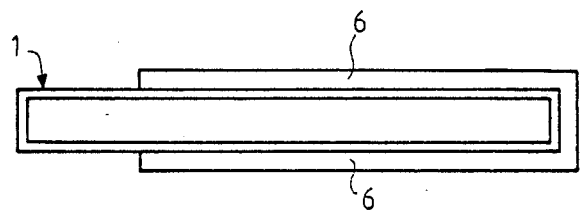
FIG_3 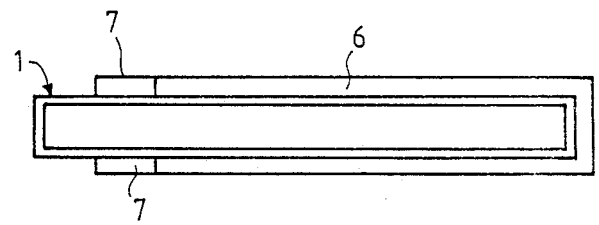
FIG_4 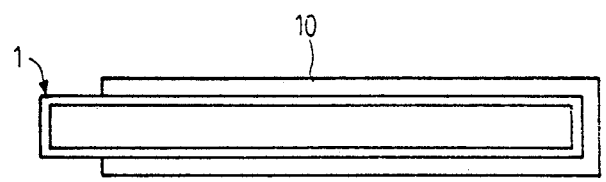
FIG_5 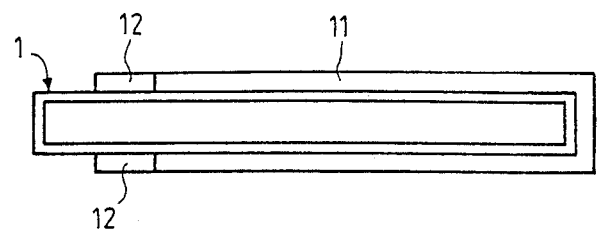

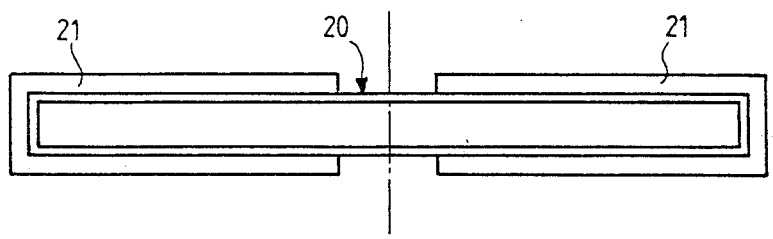
FIG_6
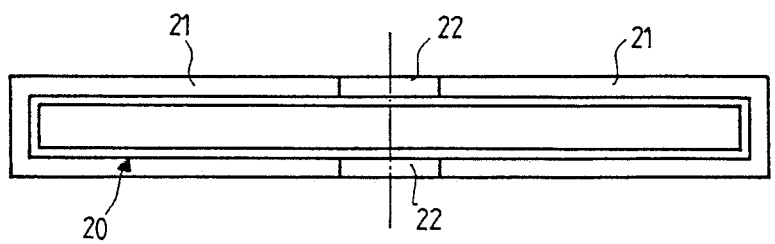
FIG_7
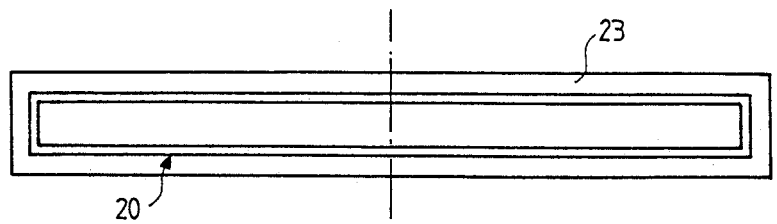
FIG_8
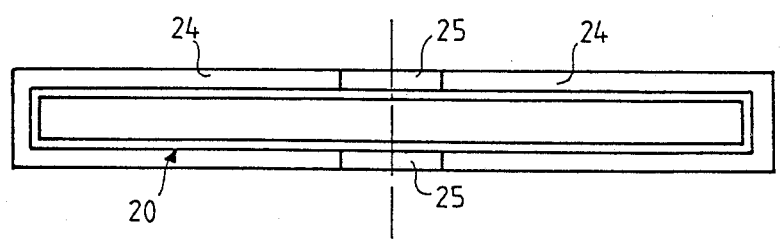
FIG_9

FIG_10
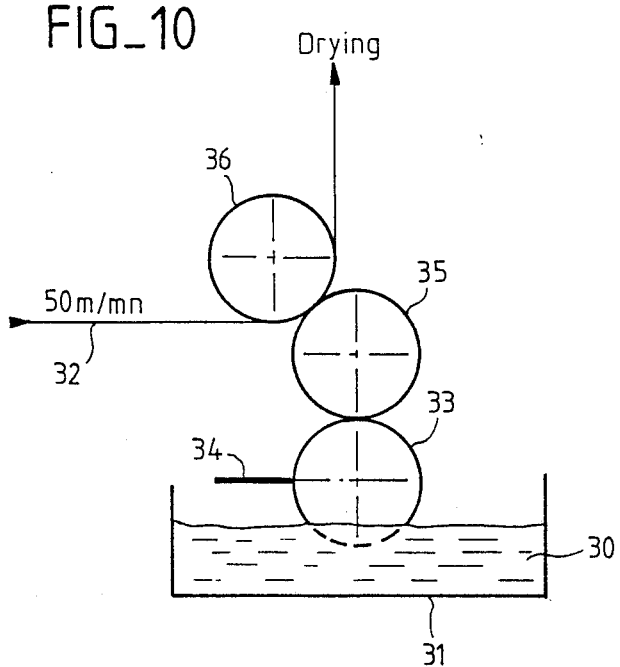
FIG_11
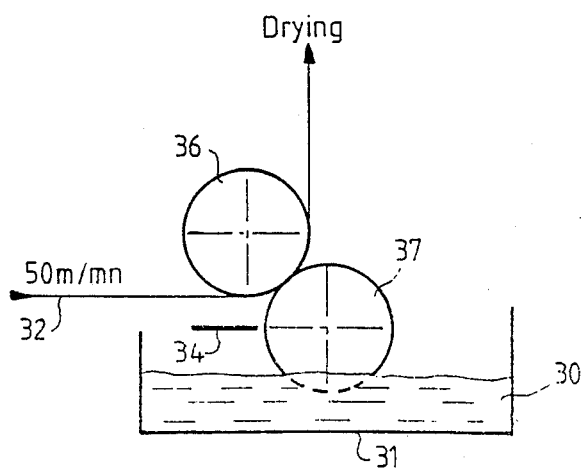

FIG_12
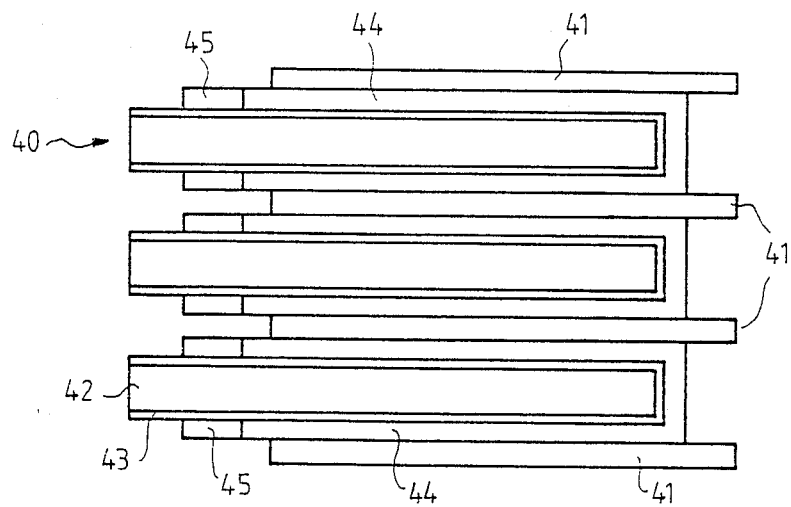
FIG_13
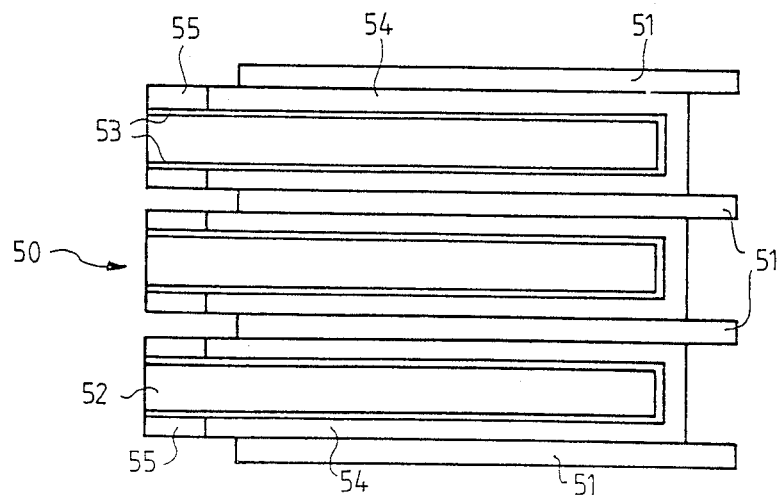

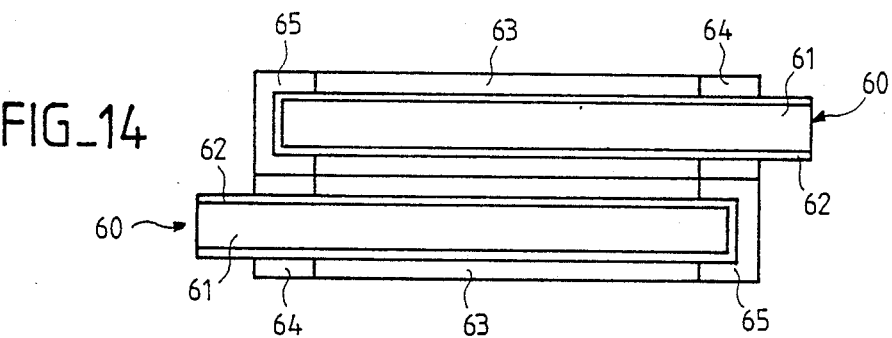
FIG_14
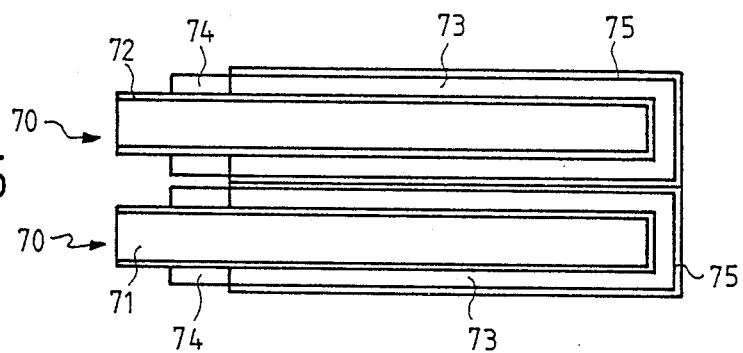
FIG_15

METALLIC STRIP DESIGNED FOR THE MANUFACTURE OF SOLID ELECTROLYTE CAPACITORS, MANUFACTURING METHOD THEREOF, AND CAPACITORS OBTAINED THEREBY

BACKGROUND OF THE INVENTION

1. Field of the Invention

The present invention concerns a metallic strip designed for the manufacture of solid electrolyte capacitors and, more particularly, the manufacture of electrolyte capacitors where the anode is made of aluminum. It also concerns the manufacturing method thereof.

2. Description of the Prior Art

Electrolyte capacitors are used above all because of their high capacitance in a restricted volume. At present, there are three classes of electrolyte capacitors, with low CxV product, in the market. There are aluminum capacitors with liquid electrolyte where the anode is made of aluminum and the cathode is an electrolyte liquid. There are also tantalum capacitors with solid electrolyte, where the anode is made of tantalum and the cathode is a solid, semiconducting electrolyte. Finally, there are aluminum capacitors with solid electrolyte: the anode is made of aluminum and the cathode is a solid semiconducting electrolyte.

The last-named class of electrolyte capacitors has undoubtedly seen development recently. The firm Philips has developed several ranges of aluminum electrolyte capacitors with solid electrolyte. The anode is made with a rolled or folded foil. The manufacturing method using a anode in the form of foil comprises the following steps:

cutting out the aluminum foil;
etching the foil;
folding the etched aluminum foil in the case of radial capacitors or rolling it up in the case of axial capacitors,
anodizing the foil to form a thin film of alumina,
forming the solid electrolyte (manganese dioxide) by pyrolysis;
positioning a cathode contact.

The method used to manufacture these capacitors is fairly complicated. It comprises a one-by-one folding operation for radial capacitors or a one-by-one rolling operation for axial capacitors. The step for the formation of the solid electrolyte is the most delicate one. Several cycles of pyrolysis (four in principle) are required, and these cycles must take place under well-determined conditions of temperature and time. It is very difficult to control these operations. Since the base product is a highly aggressive solution of manganese nitrate, the conversion into manganese dioxide has to be very fast. A post-formation operation is needed to repair the layer damaged by the nitrogen dioxide resulting from the pyrolysis.

There is a method, known through French patent FR No. 2 583 216, for the manufacture of electrolyte capacitors comprising a step for the winding of anode and cathode foils and an electrolyte support on a large-diameter wheel. This method has the advantage of simplicity, obtained by the winding method. It can be used to obtain SMC (surface-mounted component) type components. The solid electrolyte used is preferably manganese oxide but the possibility of using an organic electrolyte is also mentioned. For example, it is possible to use 7, 7, 8, 8-tetracyanoquinodimethane (more commonly called TCNQ) salts. These salts are theoretically of great value, but their use as electrolytes for capacitors raises many problems in implementation.

To overcome this drawback, the invention discloses a metallic strip coated by lacquering with an electrolyte layer, thus enabling the manufacture of a new type of solid electrolyte capacitor made by stacking or by rolling.

SUMMARY OF THE INVENTION

An object of the invention, therefore, is a metallic strip designed for the manufacture of solid electrolyte capacitors, the strip being etched and oxidated, wherein it is coated with a layer of solid electrolyte formed by a material deposited in the form of lacquer.

Another object of the invention is a method for the manufacture of a metallic strip such as the one referred to above, comprising a step wherein said electrolyte is deposited on the etched and oxidated metallic strip by lacquering.

A further object of the invention is a solid electrolyte capacitor formed by a rolling or stacking of foils obtained with the metallic strip defined above.

BRIEF DESCRIPTION OF THE DRAWINGS

The invention will be better understood and other of its advantages will emerge from the following description and from the appended figures, of which:

FIG. 1 shows a schematic sectional view of an oxidated and etched aluminum strip;

FIGS. 2 and 3 illustrate a first method, according to the invention, of making the layers of electrolyte and insulating material on the aluminum strip;

FIGS. 4 and 5 illustrate a second method, according to the invention, of making the layers of electrolyte and insulating material;

FIGS. 6 and 7 illustrate a third method, according to the invention, of making the layers of electrolyte and insulating material;

FIGS. 8 and 9 illustrate a fourth method, according to the invention, of making the layers of electrolyte and insulating material;

FIGS. 10 and 11 illustrate two known lacquering methods;

FIGS. 12 to 15 show different methods of obtaining electrolyte capacitors according to the invention.

DESCRIPTION OF PREFERRED EMBODIMENTS

The description relates, more precisely, to aluminum capacitors which, however, are used to illustrate an exemplary embodiment. Nonetheless, the invention can be applied to electrolyte capacitors for which the anodic material is of a different nature, for example, tantalum. Similarly, a TCNQ salt shall be chosen as an electrolyte, but again as a non-restrictive example. Other electrolytes, capable of being deposited by a lacquering technique, could be used.

The 7, 7, 8, 8-tetracyanoquinodimethane (TCNQ) salts and, especially N-n-butylisoquinolinum of TCNQ, have the advantage of high electrical conductivity. This value of conductivity is compatible with use in the manufacture of electrolytic capacitors.

TCNQ N-n-butylisoquinolinium is normally formed in the crystalline powder state. It is not easily fixed to filmogenic metals and to aluminum in particular. Studies on the various techniques for the adhesion of the TCNQ salts to this type of support have shown that the fixing of a TCNQ salt to a filmogenic metal having an anodized surface, by contact of the metal with the salt in the liquid state, followed by its solidification, results in a solid electrolyte capacitor with excellent qualities. By this method, it is necessary for the liquefied TCNQ salt to be cooled fairly quickly to cause its solidification. Otherwise, it would decompose. This method proves to be difficult to implement in a laboratory. It becomes all the more difficult to implement in industrial applications where a heating period has to be controlled in a reproducible way.

To manufacture aluminum electrolyte capacitors of the stacked, rolled or folded type, the method used starts with etched or oxidated aluminum foils delivered by manufacturers in the form of widths. These widths, usually 25 to 30 cm. wide, are then cut out into strips of a width appropriate to the size of the desired capacitors. A consequence of the cutting-out operation is to give strips, the sheared edges of which are not oxidated. Furthermore, owing to the transportation of the foils and their handling, certain zones of oxide on the main faces will have been damaged. The first operation to be done, therefore, will be to reform the damaged oxide layer on the aluminum strips. Whether the capacitors are of the stacked or coiled type, one of the sheared edges of the strips will have to be in electrical contact with one of the electrodes of the capacitor. It is therefore possible not to reform the oxide layer at the sheared edge which has to make contact or, in a simpler way, to reform the oxide layer at this level and, subsequently, to brush it. In the rest of this descripion, we shall consider, as an example, a case where both the sheared edges of the strips are reformed.

FIG. 1 shows a sectional view, along the width and height, of an etched and oxidated aluminum strip 1. It is formed by a band 2 of very pure aluminum, coated with an oxide layer 3. After reforming, according to a known method, the sheared edges 4 and 5 are also coated with aluminum oxide $Al_2O_3$.

The etched and oxidated aluminum strip will be partially coated with electrolyte. For, as will be shown further below, it is preferable that certain zones of the strip, which are to become the anode part of the capacitors, should be insulated. The association between the electrolyte and the insulating material can be achieved in different way.

It is possible to proceed in the manner illustrated by FIGS. 2 and 3. The strip 1 is partially coated, on both its main faces and on one sheared edge, by an electrolyte layer 6, leaving lateral margins (FIG. 2). The strip 1 also receives layers 7 of insulating material on the lateral margins. These layers 7 are in continuity with the electrolyte layers. The insulating layer 7 only partially coats the corresponding margins.

It is also possible to proceed in the manner shown in FIGS. 4 and 5. The strip 1 is coated with an electrolyte layer 10, which coats, continuously, one sheared edge and the two main faces of the strip, with the exception of two contiguous margins at the other sheared edge of the strip (FIG. 4). By passivation of those parts of the electrolyte that are located near the margins, the structure of FIG. 3 is again obtained. This is what is shown in FIG. 5 where it is seen that each main face of the strip 1 is coated with a layer of electrolyte 11, delimited by insulating parts 12.

It is possible to start with an etched and oxidated strip with a width which is twice that of the anode foils to be obtained, cover the strip with electrolyte and insulating and cut it in two lengthwise.

FIGS. 6 and 7 show a version where the electrolyte and the insulating material have different natures at the outset. In FIG. 6, an electrolyte layer 21 has been deposited on the etched and oxidated strip 20 which has a double width. This electrolyte layer 21 coats the strip except for a central band on each of its main faces. On these central bands, an insulating layer 22 is deposited. The cut made along the axis will give two strips from which the capacitors will prepared. This cut gives a non-oxidized sheared edge ready to be put into contact.

FIGS. 8 and 9 represent another version where the electrolyte and the insulating layer are made of the same material at the outset. In FIG. 8, an electrolyte layer 23 has been deposited on the etched and oxidated strip 20, which is of double width. The electrolyte layer 23 coats the strip 20 entirely. The electrolyte is passivated along a central band on each main face of the strip. A structure similar to that of FIG. 7 is obtained: two layers of electrolyte 24 separated by two insulating layers 25.

The lacquering can be made by known techniques such as flexographic printing or heliography. The differences between these two techniques are illustrated by FIGS. 10 and 11.

In the technique of flexographic printing, illustrated by FIG. 10, the electrolyte to be deposited takes the form of a polymer dissolved in a solvent. This solution 30 is in a vessel 31. The device used for the operation comprises three cylinders, which enable the feed motion of the strip 32 to be lacquered. These cylinders are movable rotationally. The frame cylinder 33, which dips into the solution 30, carries along a film of the solution by its rotation. The thickness of this film is equalized when passing before the scraper 34. The film is then transferred by the transfer cylinder 35 to the strip 32. The transfer cylinder 35 and the supporting cylinder 36 enable the feed motion of the strip at a speed which may be 50 m./min. The strip is then dried to enable the evaporation of the solvent of the solution. The device, as shown in FIG. 10, enables the lacquering of only one face of the strip at a time. By doubling the number of cylinders, it is possible to lacquer both faces at the same time.

In the heliography technique, illustrated in FIG. 11, where the references of FIG. 10 are repeated for the same elements, the cylinder 37 fulfills the role of both frame cylinder and transfer cylinder. Here again, the number of cylinders can be doubled to obtain simultaneous lacquering of both faces of the strips.

If it is desired to lacquer also the sheared edges of the strip, this can be done by positioning the cylinders vertically.

For example, the TCNQ salts can be dissolved in a solvent such as acetonitrile, N-methyl 2 pyrrolidone or dimethyl acetamide. By taking the solution to a temperature of about 100° C., efficient dissolving of the polymer and satisfactory homogeneity are obtained. The drying temperature corresponds to at least the evaporation temperature of the solvent. The maximum thicknesses of lacquer deposited are between 10 and 20 microns.

When the insulating parts are made of a material with a nature different from that of the electrolyte, this insulating material may be deposited before or after the electrolyte by using a masking technique. It is preferable for the insulating layer to have at least the same thickness as the electrolyte layer. The insulating layer may be deposited by lacquering, provided that it is a polymer suitable for lacquering. It may also be deposited by sputtering, through a mask, of electrically insulating particles.

When the insulating parts are formed by material of the same nature as that of the electrolyte, the conductive property of this material can be inhibited, either by it being placed, locally, in an appropriate solvent, under defined temperature and pressure conditions, or by it being subjected to localized thermal shock. In the case of a TCNQ salt, the passivation solvent may be dimethyl formamide. The passivation may be got under ambient temperature or at about 100° C. to activate the decomposition reaction. As for the thermal shock, it can be obtained by laser or by a saw taken to high temperature (above 220° C.) when the strip has to be cut (the example illustrated by FIGS. 8 and 9).

FIG. 12 shows an example of the use of a capacitive strip corresponding either to FIG. 3 or to FIG. 5. An electrolyte capacitor has been made by the stacking of anode foils 40 alternately with cathode contacts 41. Each anode foil 40 is formed by an aluminum strip 42 coated with an oxide layer 43. The oxide layer has been removed from the sheared edge to be contacted by brushing. The anode foils support an electrolyte layer 44 on each of their faces, and insulating layers 45 corresponding to those of FIGS. 3 and 5 (added insulating layer or passivated electrolyte). By the spraying of metal (Schoop's process) on the lateral faces of the stack, an anode electrode and a cathode electrode (not shown) are obtained.

FIG. 13 shows an example of the use of a capacitive strip corresponding either to FIG. 7 or to FIG. 9. As in FIG. 12, this figure also shows a stack of anode foils 50 alternating with cathode contacts 51. Each anode foil 50 is formed by an aluminum band 52 coated with an oxide layer 53. No brushing is needed in this case, since the anode foils have been cut out from an already reformed strip. The anode foils support electrolyte layers 54 and insulating layers 55 corresponding to those of FIGS. 7 and 9 (added insulating layer or passivated electrolyte). By the metal spraying (Schoop's process) of the lateral faces of the stack, an anode electrode and a cathode electrode (not shown) are obtained.

FIGS. 12 and 13 concern biased electrolyte capacitors. Non-biased capacitors can be obtained by the alternated superimposition of capacitive strips. FIG. 14 illustrates a configuration of this type with, by way of example, strips of the type described in FIGS. 3 and 5 but having, in addition, ends of insulated strips. The reference 60 shows an anode foil formed by an aluminum strip 61, coated with an oxide layer 62, for which the sheared edges, which have to be put into contact, have been brushed. The anode foils support electrolyte layers 63 and insulating layers 64 and 65 (added insulating layer or passivated electrolyte). By metal spraying (Schoop's process) of the lateral faces of the superimposed foils, the two electrodes of the capacitive component are obtained.

Instead of using cathode foils to make the electrical contacts, as in FIGS. 12 and 13, it is posssible to deposit a material, which is a good conductor of electricity, on the capacitive strip. This is what is shown in FIG. 15.. The reference 70 shows the anode foils formed by aluminum bands 71 covered wih oxide layers 72, for which the sheared edges which are to be put into contact have been brushed. The anode foils support electrolyte layers 73 and insulating layers 74, corresponding to those of FIGS. 7 and 9 (added insulant or passivated electrolyte). The electrolyte layers 73 are coated with layers 75 of a material which is a good conductor of electricity. This material may be graphite or a metallic coating. Depending on each case, this layer will be deposited by vacuum evaporation, cathode sputtering, spraying of particles, (mineral, organic or metallic) in molten form or in solvent phase. It is advantageous for the material used to be slightly oxidable or non-oxidable so that the capacitor undergoes the moist heat tests without damage. By metal spraying (Schoop's process) of the side faces of the stack, an anode electrode and a cathode electrode (not shown) are obtained.

The making of electrolyte capacitors other than those shown in FIGS. 12 to 15 comes within the scope of this invention.

The invention provides many advantages. The lacquered capacitive strips enable simple and rapid checks of their characteristics. They are elementary capacitors on which capacitance, leakage current and dielectric loss factor can be measured periodically. The manufacturing method used to obtain capacitive components is simple and provides for nonstop working. Since the thickness of the electrolyte deposited by lacquering is very small, the volume capacity of the capacitors obtained is great.

Finally, the invention enables the obtaining of electrolyte capacitors of any type: stacked or coiled.

What is claimed is:

1. A metallic strip designed for the manufacture of solid electrolyte capacitors, the strip being etched and oxidated, wherein it is coated with a layer of solid electrolyte from a material deposited thereon in the form of a lacquer, wherein said strip also supports layers of insulating material designed for the electrical protection of the electrolyte.

2. A method designed for the manufacture of solid electrolyte capacitors from a metallic strip, the strip being etched and oxidated, wherein it is coated with a layer of solid electrolyte from a material deposited thereon in the form of a lacquer, comprising depositing, by lacquering, a solid electrolyte on an etched and oxidated metallic strip, and further providing an insulating layer on said solid electrolyte for electrical protection of the solid electrolyte.

3. A method according to claim 2, wherein said insulating layer is provided by passivation of determined zones of the electrolyte.

4. A method according to claim 3, wherein the passivation of the electrolyte is effected by passing the zones to be passivated through a passivation solvent.

5. A method according to claim 3, wherein the passivation of said zones of electrolyte is effected by thermal shock.

6. A method according to claim 3, wherein the passivation is effected during longitudinal cutting of the metallic strip by the thermal shock associated with the means implemented to perform this cutting.

7. A method according to claim 2, wherein the strip is obtained by longitudinal cutting of a metallic strip of double width.

8. A method according to claim 7, wherein the cutting is done in a zone of the strip covered with an insulating layer.

* * * * *